(12) United States Patent
Lee et al.

(10) Patent No.: US 10,095,294 B2
(45) Date of Patent: Oct. 9, 2018

(54) SYSTEM AND METHOD OF GUIDING USE OF ELECTRONIC DEVICE

(71) Applicant: Encored Technologies, Inc., Seoul (KR)

(72) Inventors: Seonjeong Lee, Seoul (KR); Hyoseop Lee, Seoul (KR); Jong-woong Choe, Seoul (KR)

(73) Assignee: ENCORED TECHOLOGIES, INC., Seoul (KR)

( * ) Notice: Subject to any disclaimer, the term of this patent is extended or adjusted under 35 U.S.C. 154(b) by 89 days.

(21) Appl. No.: 15/249,429

(22) Filed: Aug. 28, 2016

(65) Prior Publication Data
US 2017/0344088 A1 Nov. 30, 2017

(30) Foreign Application Priority Data
May 31, 2016 (KR) .......................... 10-2016-0067196

(51) Int. Cl.
*G06F 1/28* (2006.01)

(52) U.S. Cl.
CPC ..................... *G06F 1/28* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 8,307,229 B2* | 11/2012 | Lee | .................. | G01R 22/10 702/60 |
| 9,672,577 B2* | 6/2017 | Gatts | .................. | G06Q 50/06 |
| 2007/0220292 A1* | 9/2007 | Ishihara | .............. | G06F 17/5022 713/320 |

(Continued)

*Primary Examiner* — Zahid Choudhury
(74) *Attorney, Agent, or Firm* — John H. Choi & Associates LLC

(57) ABSTRACT

Disclosed are a method and a system for guiding use of an electronic device. The method of guiding use of an electronic device includes: separating a first power used amount for a first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information; calculating a first predicted power used amount for the first electronic device from a first time point to a second time point by using a prediction value of the predetermined factor from the first time point to the second time point; calculating a second predicted power used amount for the second electronic device from the first time point to the second time point; and providing guide information including a use time or an amount used for the first electronic device from the first time point to the second time point in consideration of a target amount of power used from the first time point to the second time point and the first and second predicted power used amounts.

11 Claims, 5 Drawing Sheets

(56) References Cited

U.S. PATENT DOCUMENTS

| | | | | |
|---|---|---|---|---|
| 2011/0125703 A1* | 5/2011 | Chuang | ............... | G01R 21/133 |
| | | | | 706/54 |
| 2012/0259469 A1* | 10/2012 | Ward | .................... | G05B 15/02 |
| | | | | 700/276 |
| 2012/0330586 A1* | 12/2012 | Gatts | .................... | G06F 1/3203 |
| | | | | 702/61 |
| 2013/0158911 A1* | 6/2013 | Young | ..................... | H04Q 9/00 |
| | | | | 702/62 |
| 2014/0163908 A1* | 6/2014 | Kubota | ............... | G01R 21/133 |
| | | | | 702/61 |
| 2015/0254554 A1* | 9/2015 | Kato | ................... | G06N 3/0454 |
| | | | | 706/21 |

* cited by examiner

| INPUT PLANNED AMOUNT OF MONEY FOR USE |||
|---|---|---|
| 70,000 || OK |
| 1 | 2<br>ABC | 3<br>DEF |
| 4<br>GHI | 5<br>JKL | 6<br>MNO |
| 7<br>PQRS | 8<br>TUV | 9<br>WXYZ |
|  | 0 | ⌫ |

FIG. 3

SYSTEM AND METHOD OF GUIDING USE OF ELECTRONIC DEVICE

CROSS-REFERENCE TO RELATED APPLICATIONS

This application claims priority to and the benefit of Korean Patent Application No. 10-2016-0067196 filed in the Korean Intellectual Property Office on May 31, 2016, the entire contents of which are incorporated herein by reference.

TECHNICAL FIELD

The present invention relates to a system and a method of guiding use of an electronic device.

BACKGROUND ART

Excessive use of cooling systems in the summer season or heating systems in the winter season frequently causes large electric charges. The excessive electric charges may be generated due to a failure of efficient use of a seasonal electronic device, such as a cooling system or a heating system. Accordingly, when guide information for efficiently using a seasonal electronic device within the electric charges predetermined by a user is provided to the user, it is possible to prevent the excessive electric charges and improve usefulness for the user.

SUMMARY OF THE INVENTION

This work was funded by the Korean Meteorological Administration Research and Development Program under Grant KMIPA 2015-4070.

A technical object to be solved by the present invention is to provide a method of guiding use of an electronic device which is capable of preventing the excessive electric charges and improving usefulness for a user.

Another technical object to be solved by the present invention is to provide a system for guiding use of an electronic device which is capable of preventing the excessive electric charges and improving usefulness for a user.

Technical objects of the present invention are not limited to the aforementioned technical objects, and other technical objects which are not mentioned will be apparently appreciated by those skilled in the art from the following description.

An exemplary embodiment of the present invention provides a method of guiding use of an electronic device, including: separating a first power used amount for a first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information; calculating a first predicted power used amount for the first electronic device from a first time point to a second time point by using a prediction value of the predetermined factor from the first time point to the second time point; calculating a second predicted power used amount for the second electronic device from the first time point to the second time point; and providing guide information including a use time or an amount used for the first electronic device from the first time point to the second time point in consideration of a target amount of power used from the first time point to the second time point and the first and second predicted power used amounts.

The calculating of the first predicted power used amount by using the prediction value of the predetermined factor from the first time point to the second time point may include: receiving a minimum value and a maximum value of the predetermined factor from the first time point to the second time point for each first section; generating a prediction value of the predetermined factor for each second section, which is smaller than the first section, by using interpolation; and calculating the first predicted power used amount by using the generated prediction values of the predetermined factor.

The calculating of the first predicted power used amount by using the prediction value of the predetermined factor from the first time point to the second time point may include: receiving a prediction value of the predetermined factor from a third time point, which is later than the first time point, to the second time point, or receiving a prediction value of the predetermined factor from the first time point to a fourth time point, which is earlier than the second time point; generating a prediction value of the predetermined factor from the first time point to the second time point by using extrapolation; and calculating the first predicted power used amount by using the generated prediction values of the predetermined factor.

The providing of the guide information may include: providing all of the first predicted power used amount as the guide information when a value obtained by subtracting the second predicted power used amount from the target amount of power used is larger than the first predicted power used amount, and providing a part of the first predicted power used amount as the guide information when the value obtained by subtracting the second predicted power used amount from the target amount of power used is smaller than the first predicted power used amount.

The second predicted power used amount may be calculated based on the second power used amount.

The predetermined factor may include a temperature, and the first electronic device may include at least one of a cooling device and a heating device.

Another exemplary embodiment of the present invention provides a system for guiding use of an electronic device, including: a predicted power used amount calculating unit configured to separate a first power used amount for a first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information, calculate a first predicted power used amount for the first electronic device from a first time point to a second time point by using a prediction value of the predetermined factor from the first time point to the second time point, and calculate a second predicted power used amount for the second electronic device from the first time point to the second time point; and a guide information providing unit configured to provide guide information including a use time or an amount used for the first electronic device from the first time point to the second time point in consideration of a target amount of power used from the first time point to the second time point and the first and second predicted power used amounts.

The predicted power used amount calculating unit may receive prediction information of the predetermined factor from the outside, and calculate a prediction value of the predetermined factor by using at least one of interpolation and extrapolation.

Yet another exemplary embodiment of the present invention provides a system for guiding use of an electronic device, including: an output unit configured to provide a user with an interface; and a guide information providing unit configured to output guide information including a use time or an amount used for a first electronic device from a first time point to a second time point to the output unit, in which the guide information is provided by separating a first power used amount for the first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information, calculating a first predicted power used amount for the first electronic device from the first time point to the second time point by using a prediction value of the predetermined factor from the first time point to the second time point, calculating a second predicted power used amount for the second electronic device from the first time point to the second time point, and considering a target amount of power used from the first time point to the second time point and the first and second predicted power used amounts.

The system may further include an input unit configured to receive target electric charges from the user in order to set the target amount of power used from the first time point to the second time point.

Other detailed matters of the exemplary embodiments are included in the detailed description and the drawings.

According to the exemplary embodiments of the present invention, a user may use a seasonal electronic device within electric charges planned by the user, thereby avoiding excessive electric charges. Further, the method of using a seasonal electronic device, which maximizes usefulness for a user within electric charges planned by the user, is suggested, so that the satisfaction of the user may be increased.

BRIEF DESCRIPTION OF THE DRAWINGS

FIGS. 3 to 6 are diagrams for describing an electronic device use guiding method according to several exemplary embodiments of the present invention.

DETAILED DESCRIPTION

Figure 1:
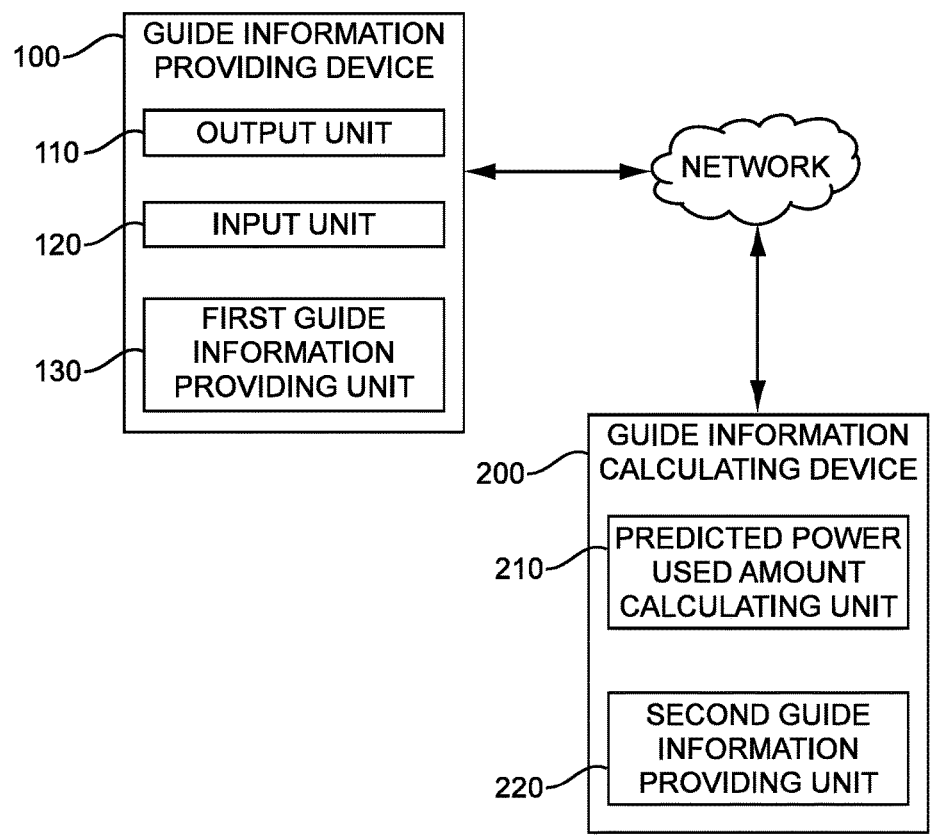
FIG. 1 is a block diagram illustrating an electronic device use guiding system according to several exemplary embodiments of the present invention.

Advantages and features of the present invention and methods accomplishing the advantages and features will become apparent from the following detailed description of exemplary embodiments with reference to the accompanying drawings. However, the present invention is not limited to exemplary embodiment disclosed herein but will be implemented in various forms. The exemplary embodiments are provided so that the present invention is completely disclosed, and a person with ordinary skill in the art can fully understand the scope of the present invention. Therefore, the present invention will be defined only by the scope of the appended claims. The size and relative size of the constituent elements marked in the drawings may be exaggerated for clarity of description. Throughout the specification, the same reference numeral refers to the same constituent element, and a term "and/or" includes each of the mentioned items and all combinations of one or more of the mentioned items.

The terms used in the present specification are for explaining the embodiments rather than limiting the present invention. Unless particularly stated otherwise in the present specification, a singular form also includes a plural form. "Comprise" and/or "comprising" used in the specification does not exclude existence or addition of one or more other constituent elements, in addition to the mentioned constituent element.

Although names of various devices or constituent elements are discriminatingly used as "a first . . . ", a second . . . ", and the like, it is apparent that the devices or the constituent element are limited by the terms. The terms are simply used for discriminating one device or constituent element from another device or constituent element. Accordingly, a first device or constituent element referred below may be a second device or constituent element within the technical spirit of the present invention.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless explicitly and specifically defined.

FIG. 1 is a block diagram illustrating an electronic device use guiding system according to several exemplary embodiments of the present invention.

Referring to FIG. 1, an electronic device use guiding system may include a guide information providing device 100 and a guide information calculating device 200.

The guide information providing device 100 may provide guide information provided from the guide information calculating device 200 to a user. The user may increase efficiency of the use of an electronic device while avoiding excessive electric charges by using the electronic device according to the guide information displayed on the guide information providing device 100.

In several exemplary embodiments, the guide information providing device 100 may be implemented in a form of a mobile terminal, such as a cellular phone, a smart phone, and a tablet PC. In this case, the guide information providing device 100 may be implemented in a form of software installable or programmable in the mobile terminal.

In several exemplary embodiments, the guide information providing device 100 may be implemented as a part of an electronic device. For example, when an electronic device is an air conditioner, the guide information providing device 100 may be embedded in or wirely/wirelessly connected to the air conditioner to provide guide information to the air conditioner.

The guide information providing device 100 may include an output unit 110, an input unit 120, and a first guide information providing unit 130.

Figure 5:
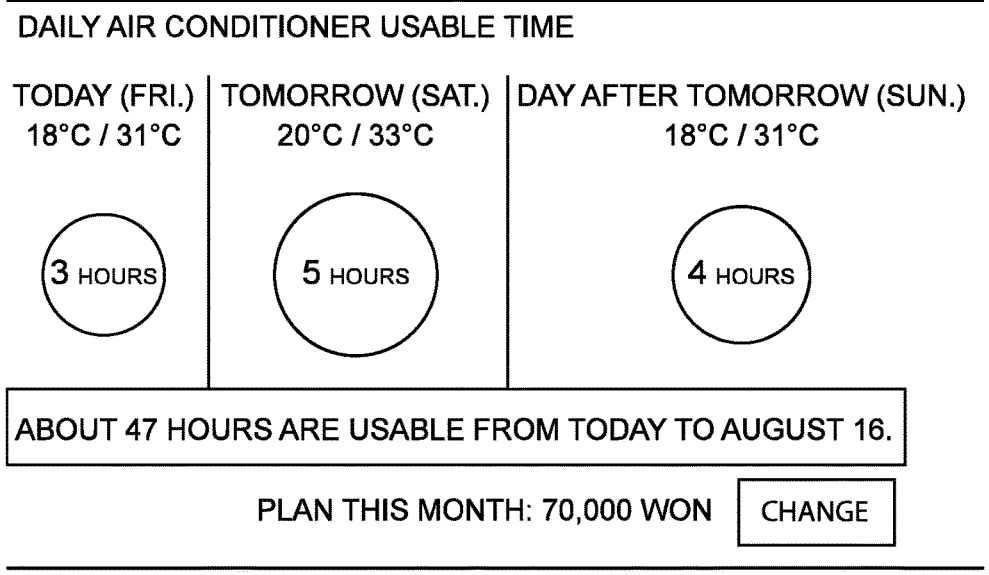

The output unit 110 may output an interface for providing the guide information to the user. For example, when an electronic device is an air conditioner, the output unit 110 may output an interface about a daily available time for the use of the air conditioner to the user as illustrated in FIG. 5.

The input unit 120 may output a predetermined interface for receiving an input from the user to the user. In several exemplary embodiments, for example, the input unit 120 may provide an interface for receiving an input of target electric charges by the user to the user as illustrated in FIG. 3.

Although the output unit 110 and the input unit 120 are separately illustrated in the drawing, the technical spirit of the present invention is not limited thereto. As necessary, the output unit 110 and the input unit 120 may also be combined into one by a scheme, such as a touch panel, and implemented.

The first guide information providing unit 130 may control the output unit 110 so that the output unit 110 provides the guide information to the user. Particularly, the first guide information providing unit 130 may control the output unit 110 so that the output unit 110 outputs the guide information including a use time or the amount of power used of a seasonal electronic device. In several exemplary embodiments, the guide information may be provided from a second guide information providing unit 220. That is, the first guide information providing unit 130 may receive the guide information from the second guide information providing unit 220 through, for example, a network, and output the received guide information to the user through the output unit 110.

In several exemplary embodiments, the first guide information providing unit 130 may also provide an input of the user input through the input unit 120 to the guide information calculating device 200 through, for example, a network.

The guide information calculating device 200 may calculate guide information for the use of a corresponding electronic device (for example, a seasonal electronic device, such as an air conditioner or a heater) based on information on the amount of power used by the user, and provide the calculated guide information to the guide information providing device 100.

In several exemplary embodiments, the guide information calculating device 200 may be implemented in a form of, for example, a server. When the guide information calculating device 200 is implemented in a form of a computing system, such as a server, a predicted power used amount calculating unit 210 and the second guide information providing unit 220 may be implemented in a form of, for example, software, and executed through a calculating device, such as a processor.

The predicted power used amount calculating unit 210 may calculate a predicted power used amount of a corresponding electronic device (for example, a seasonal electronic device, such as an air conditioner or a heater) or other electronic devices. The second guide information providing unit 220 may provide guide information about the use of the corresponding electronic device (for example, a seasonal electronic device, such as an air conditioner or a heater) in consideration of the predicted power used amount calculated by the predicted power used amount calculating unit 210 and the target amount of power used.

Hereinafter, an electronic device use guiding method according to several exemplary embodiments of the present invention will be described with reference to FIGS. 1 to 6.

Figure 2:
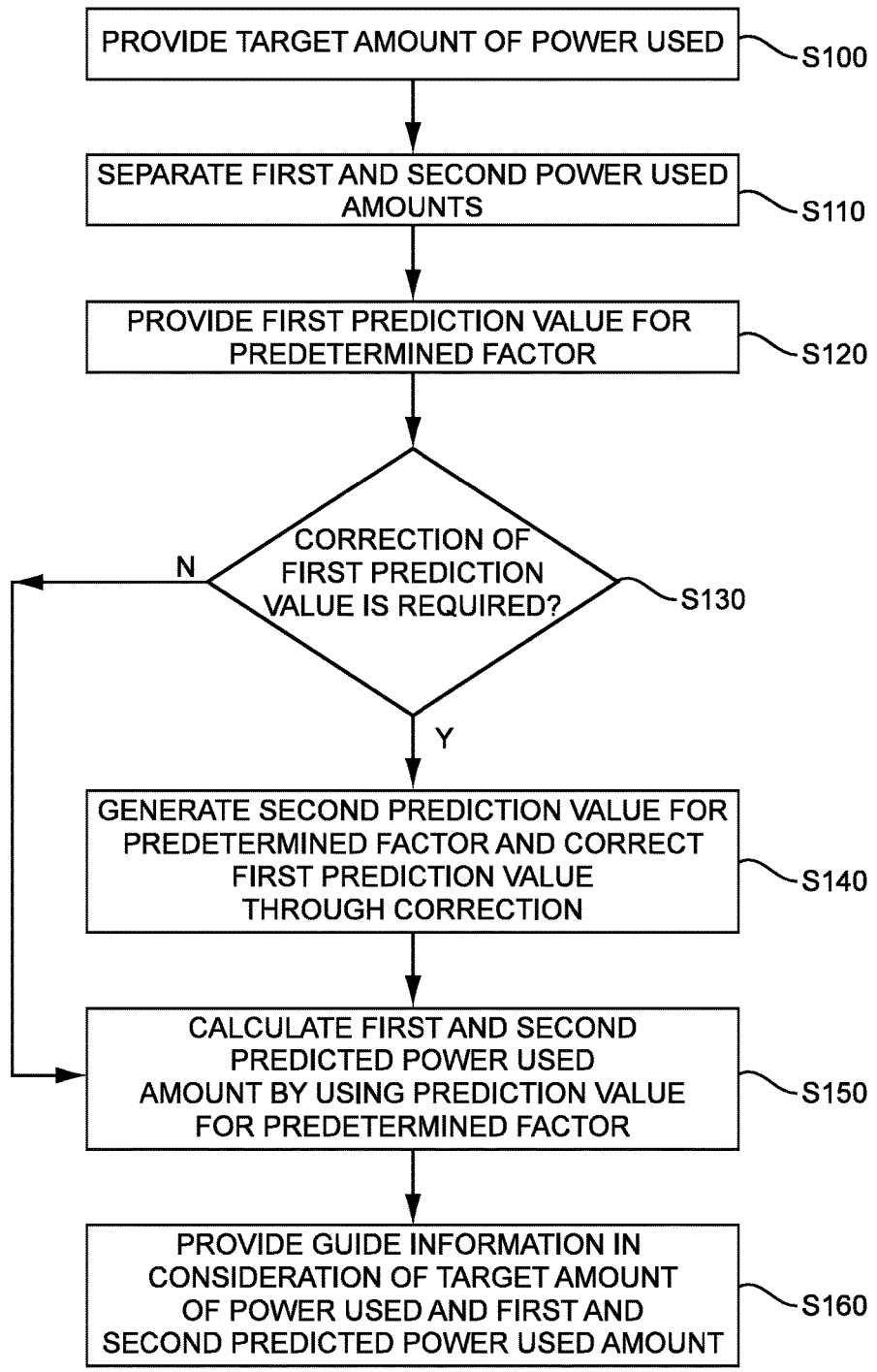
FIG. 2 is a flowchart illustrating an electronic device use guiding method according to several exemplary embodiments of the present invention.

FIG. 2 is a flowchart illustrating an electronic device use guiding method according to several exemplary embodiments of the present invention. FIGS. 3 to 6 are diagrams for describing an electronic device use guiding method according to several exemplary embodiments of the present invention.

First, referring to FIG. 2, a target amount of power used is provided (S100). For example, the guide information providing device 100 may receive a target amount of power used from a user through the input unit 120. In several exemplary embodiments, the guide information providing device 100 may also receive target electric charges for setting the target amount of power used from the user through the input unit 120 as illustrated in FIG. 3.

Figure 4:
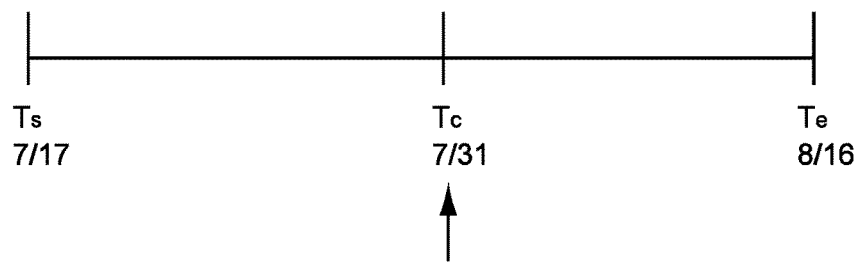

Hereinafter, for convenience of the description, as illustrated in FIG. 4, the description will be given based on an assumption that a current time Tc is July, 31, a start time Ts is July 17, and an end time Te is August 16. The user may input target electric charges from the start time Ts to the end time Te as 70,000 won.

When the target electric charges are input from the user, the guide information providing device 100 or the guide information calculating device 200 may convert the target electric charges into a target amount of power used.

First, referring to FIG. 2, first and second power used amounts are separated (S110). Particularly, the predicted power used amount calculating unit 210 of the guide information calculating device 200 may separate a first power used amount for a first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information of the user.

Hereinafter, for convenience of the description, the description will be given based on an assumption that the predetermined factor is a temperature, the first electronic device is a seasonal electronic device (for example, an air conditioner or a heater), of which an amount used is sensitively changed according to a temperature, and the second electronic devices are other electronic devices, of which amounts used are not sensitively changed according to a temperature. However, this is simply one example, and the technical spirit of the present invention is not limited to the example.

The predicted power used amount calculating unit 210 may separate a power used amount of the seasonal electronic device, in which a degree of correlation between a temperature and the power used amount is high, and the power used amount of other electronic devices from the power used amount information of the user.

In several exemplary embodiments, the method disclosed in Korean Patent Application No. 10-2014-0018391 or 10-2014-0134958 previously filed by the applicant of the present invention may be used for the separation of the power used amount. That is, the contents disclosed in Korean Patent Application No. 10-2014-0018391 or 10-2014-0134958 may be included in the present specification.

In several other exemplary embodiments, a method represented in Equation 1 below may be used for the separation of the power used amount.

$$P(T) = P_{habitual} + P_{seasonal}(T) \qquad \text{[Equation 1]}$$

(Here, T represents a temperature, and P_seasonal means a power used amount of a seasonal electronic device, and P_habitual means a power used amount of other electronic devices.)

The power used amount P_habitual of other electronic devices may be estimated by using an intermediate value of the amount used at the same time on the same day of the week for power used amount data of a time at which the temperature T is pleasant. In this case, when there is an event, such as a holiday, causing a change in a habitual pattern of the user, the amount used may also be estimated by excluding the event or changing to information about a similar day, such as a weekend. Here, the power used amount P_habitual of other electronic devices may be the second power used amount.

A power used amount obtained by excluding the estimated power used amount P_habitual of other electronic devices from a power used amount for each time is set as the power used amount P_seasonal of the seasonal electronic device, which is changed according to a temperature, and the power used amount P_seasonal of the seasonal electronic device may be modelled and represented as Equation 2 below.

$$P_{seasonal} = \begin{cases} f(T) := a_H(T - T_H) & \text{if } T_H < T \\ 0 & \text{if } T_C < T \leq T_H \\ g(T) := a_C(T - T_C) & \text{if } T \leq T_C \end{cases} \quad \text{[Equation 2]}$$

A temperature at which a user starts to turn on the seasonal electronic device is set with the highest temperature limit value T_H and the lowest temperature limit value T_C. For example, when a temperature is increased by a predetermined degree or more at a time, at which a season is changed from spring to summer, a user starts to turn on an air conditioner, so that a variable for this case may be set as $T_H$. Since the amount of power used of the seasonal electronic device is influenced by an outside temperature, a model representing a correlation between a temperature and the amount of power used of the seasonal electronic device is designed through a method, such as a regression analysis. When data is sufficient, T_C and T_H may be estimated, and when data is not sufficient, a pre-input fixed value may also be utilized. Equation 2 represents an example, in which the amount of power used by the seasonal electronic device used in the summer season and the winter season is estimated through a linear regression analysis. Here, the amount P_seasonal of power used of the seasonal electronic device may be the first power used amount.

Next, referring to FIG. 2, a first prediction value for the predetermined factor is provided (S120).

For example, the predicted power used amount calculating unit 210 may receive a weather condition, such as a future temperature, and other information determining the power used amount. In this case, the weather information, such as a temperature, may include for example, information provided from the metrological administration.

In a case of the power used amount P_habitual of other electronic devices, the future amount of power used for each time zone for each same day may be estimated by utilizing a median value of the previous amount of power used for each time zone for each day.

The method disclosed in Korean Patent Application No. 10-2014-0018391 or 10-2014-0134958 previously filed by the applicant of the present invention may be used for calculating the amount P_seasonal of power used of the seasonal electronic device estimated by using Equations 1 and 2. That is, the contents disclosed in Korean Patent Application No. 10-2014-0018391 or 10-2014-0134958 may be included in the present specification.

Next, referring to FIG. 2, it is determined whether the first prediction value needs to be corrected, and when it is determined that the first prediction value needs to be corrected, the corrected first prediction value and a second prediction value are generated. Then, a first predicted power used amount that is the predicted power used amount of the seasonal electronic device and a second predicted power used amount that is the predicted power used amount of other electronic devices are calculated by using the corrected prediction value (S130, S140, and S150).

First, when a prediction unit of the weather information, such as a temperature, received by the predicted power used amount calculating unit 210 does not correspond to a time unit for predicting the amount P_seasonal of power used of the seasonal electronic device, interpolation is available through Equation 3 below.

[Equation 3]

$$\widetilde{T^d(h)} = \begin{cases} T_{sun}^{(d-1)} + (T_{min}^d - T_{sun}^{(d-1)}) \times \left(\dfrac{h - H_{sun}^{(d-1)}}{H_{min}^d - H_{sun}^{(d-1)}}\right)^{z1} & \text{if } 0 \leq h < H_{min}^d \\[2mm] T_{min}^d + (T_{max}^d - T_{min}^d) \times \dfrac{1}{2}\left\{1 + \sin\left(\dfrac{h - H_{min}^d}{H_{max}^d - H_{min}^d}\pi - \dfrac{\pi}{2}\right)\right\} & \text{if } H_{min}^d \leq h < H_{max}^d \\[2mm] T_{sun}^d + (T_{max}^d - T_{sun}^d) \times \sin\left\{\left(1 + \dfrac{h - H_{max}^d}{H_{sun}^d - H_{max}^d}\right) \times \dfrac{\pi}{2}\right\} & \text{if } H_{max}^d \leq h < H_{sun}^d \\[2mm] T_{sun}^d + (T_{min}^{d+1} - T_{sun}^d) \times \left(\dfrac{h - H_{sun}^d}{H_{min}^{d+1} - H_{sun}^d}\right)^{z2} & \text{if } H_{sun}^d \leq h < 24 \end{cases}$$

Here, h means a time between 0 to 23, and d is a superscript meaning a date, and T^d(h) means a temperature at time h on the date d. T_{min}^d, T_{max}^d, and T_{sun}^d mean the lowest temperature, the highest temperature, and a temperature in the sunset hour on the date d, respectively. H_{min}^d, H_{max}^d, and H_{sun}^d mean the lowest temperature, the highest temperature, and a time, at which the sunset is observed, on the date d, respectively. Further, z_1 and z_2 are functions adjusting a shape of a curve of an increase/decrease of a temperature according to a time, and are variables determined from weather information which was observed in the past. That is, z_1 and z_2 are variables obtainable through the regression analysis by applying the function defined as Equation 3 to past weather information data. In this case, when the data is not sufficient, a pre-input fixed value may also be utilized.

When a maximum value and a minimum value of an outside temperature are given as predicted information, it is possible to approximate temperature information of all of the time zones for each section by utilizing the predicted information. In this case, it is possible to predict time zones $H^d\_\{min\}$, $H^d\_\{max\}$, in which the outside temperature is highest and lowest, and a sunset time zone H^d_{sun} for each date or each month by utilizing the past weather information, and it is possible to approximate a daily outside temperature function in a form of a trigonometrical function or an exponential function by dividing one day into several sections through the predicted time zones.

The daily lowest temperature and the daily highest temperature T_^d_{min}, T_^d_{max} may be obtained from the predicted weather information, and when it fails to obtain the predicted weather information, weather information of a previous year or a previous day may be used. Further, the outside temperature T_^d_{sum} $T_{sum}^d = (1+w) T_{min}^{d+1} - wT_{max}^d$ at the sunset may be represented with a weighted sum with the daily highest temperature and the daily lowest temperature by using the past information. In this case, the weight may be obtained from Equation 4 below.

$$\min_\omega \sum_d [\{T_{min}^{d+1} - \omega(T_{max}^d - T_{min}^{d+1})\} - T_{sum1}^d]^2 \quad \text{[Equation 4]}$$

In the meantime, when a prediction time period for a temperature in the weather condition is shorter than a time period for predicting the amount P_seasonal of power used of the seasonal electronic device, extrapolation is available through a method below.

It is possible to calculate a difference in a value of a temperature by comparing a temperature of the same time of a previous year for a section, in which a predicted or estimated value for a temperature is given, and it is possible to obtain a function formula for a progress of an increase/decrease of a temperature according to a time through the regression analysis. With the function as a correction value of a correction function, for a section, in which a weather prediction value is not given, a weather condition may be extrapolated with a sum of the temperature at the same time of the previous year and the correction value and represented.

In this case, when it is assumed that there is weather forecast information from a current time to the date D, weather information after the date D is represented by Equation 5 below. In this case, d-365 represents past weather information, and function f is a function interpolating a difference between the weather information from the current to the date D and the weather information on the same date of the previous year. That is, the function f is a function representing a change in weather information for one year through the regression analysis.

[Equation 5]

$$T^d(h) = \begin{cases} \widetilde{T^d(h)} & \text{if } d \leq D \\ T^{d-365}(h) + \int (d, \widetilde{T^d(h)} - T^{1-365}(h), \ldots, \widetilde{T^d(h)} - T^{D-365}(h)) & \text{if } d > D \end{cases}$$

Next, referring to FIG. 2, guide information is provided in consideration of a target amount of power used received from the user and the previously predicted first and second predicted power used amount (S160).

For example, the second guide information providing unit 220 may generate guide information in consideration of the target amount of power used and the first and second predicted power used amount, provide the generated guide information to the first guide information providing unit 130 and the like, and make the first guide information providing unit 130 display the guide information to the user.

For example, as illustrated in FIG. 5, an available operation time for the seasonal electronic device may be displayed by dividing a value obtained by excluding a total power used amount by a previous day (for example, July 30 in FIG. 4) and the predicted power used amount of other electronic devices predicted by the end time Te from the target amount of power used with a time-unit power consumption average of the seasonal electronic device. In this case, when the available time is smaller than 0, a message notifying that there is no available time may be displayed, or a message requiring an increase of a planned amount of power used may be output to the user.

In the meantime, information about the seasonal electronic device input from the user, or the intermediate value of the amount of power consumed based on a time for a time, in which the seasonal electronic device is operated, estimated in operation S100 may be used as the time-unit power consumption average of the seasonal electronic device.

When a sum of the predicted amounts of power used by all of the electronic devices does not exceed the target amount of power used, the display of the guide information illustrated in FIG. 5 may use, for example, a method below.

(1) Display the guide information by dividing predicted expected power used amounts of the seasonal electronic device of today, tomorrow, and the day after tomorrow by a time-unit power consumption average (2) Display the guide information by adding a value obtained by dividing a residual power amount, which does not exceed the target amount of power used, by the time-unit power consumption average of the seasonal electronic device and then by the number of days left until the end time Te to a value obtained by dividing predicted expected power used amounts of the seasonal electronic device of today, tomorrow, and the day after tomorrow with the estimated time-unit power consumption average.

(3) Display the guide information for a time period longer than today, tomorrow, and the day after tomorrow in FIG. 5.

When the sum of the predicted power used amounts of all of the electronic devices is larger than the target amount of power used, the guide information illustrated in FIG. 5 may be displayed through a method below.

In a case where the target amount of power used during a given time period is given as B, a sum of 1, 2, and 3 should not exceed the target amount of power used, in which 1. the total amount P_current of power used from a start time Ts to a current time Tc, 2. the amount sum P_seasonal, j of power used of the seasonal electronic device from the current time Tc to the end time Te, and 3. the amount sum P_habitual, j of power used of other electronic devices during the same period as that of 2.

Accordingly, when it is determined that the sum of the amounts of power used of 1 to 3 exceeds B, it is necessary to make the total amount of power used belong to the planned range B by decreasing an operation time of the electronic device.

[Equation 6]

$$P_{seasonal,optimal} = \begin{cases} 0 & \text{if } B <= P_{current} + \sum_{j \in J} P_{habitual,j} \\ \sum_{j \in J} P_{seasonal,j} & \text{if } B >= P_{current} + \sum_{j \in J} (P_{habitual,j} + P_{seasonal,j}) \\ \sum_{j \in J' \subset J} P_{seasonal,j} & \text{otherwise} \end{cases}$$

When a predicted sum of the amount P_current of power used by the current time and the amount sum P_habitual, j of power used of other electronic devices exceeds the planned range B, an operation available time is suggested with 0.

When a predicted sum (sum of P_habitual+sum of P_habitual) of the amount P_current of power used by the current time and the amount of power used of all of the electronic devices does not exceeds the planned range B, a use time is suggested so that an operation of the seasonal electronic device is possible for the whole section, in which a prediction value of the amount of power used of the seasonal electronic device is not 0.

Last, in a section, in which a value obtained by subtracting the amount P_current of power used by the current time and the amount sum P_habitual, j of power used of other electronic devices from the planned range B is represented to be smaller than the amount sum P_seasonal, j of power used by the seasonal electronic device, an optimum operation time is suggested with a value obtained by excluding a part of the section, in which the prediction value of the amount of power used of the seasonal electronic device is not 0.

Figure 6:
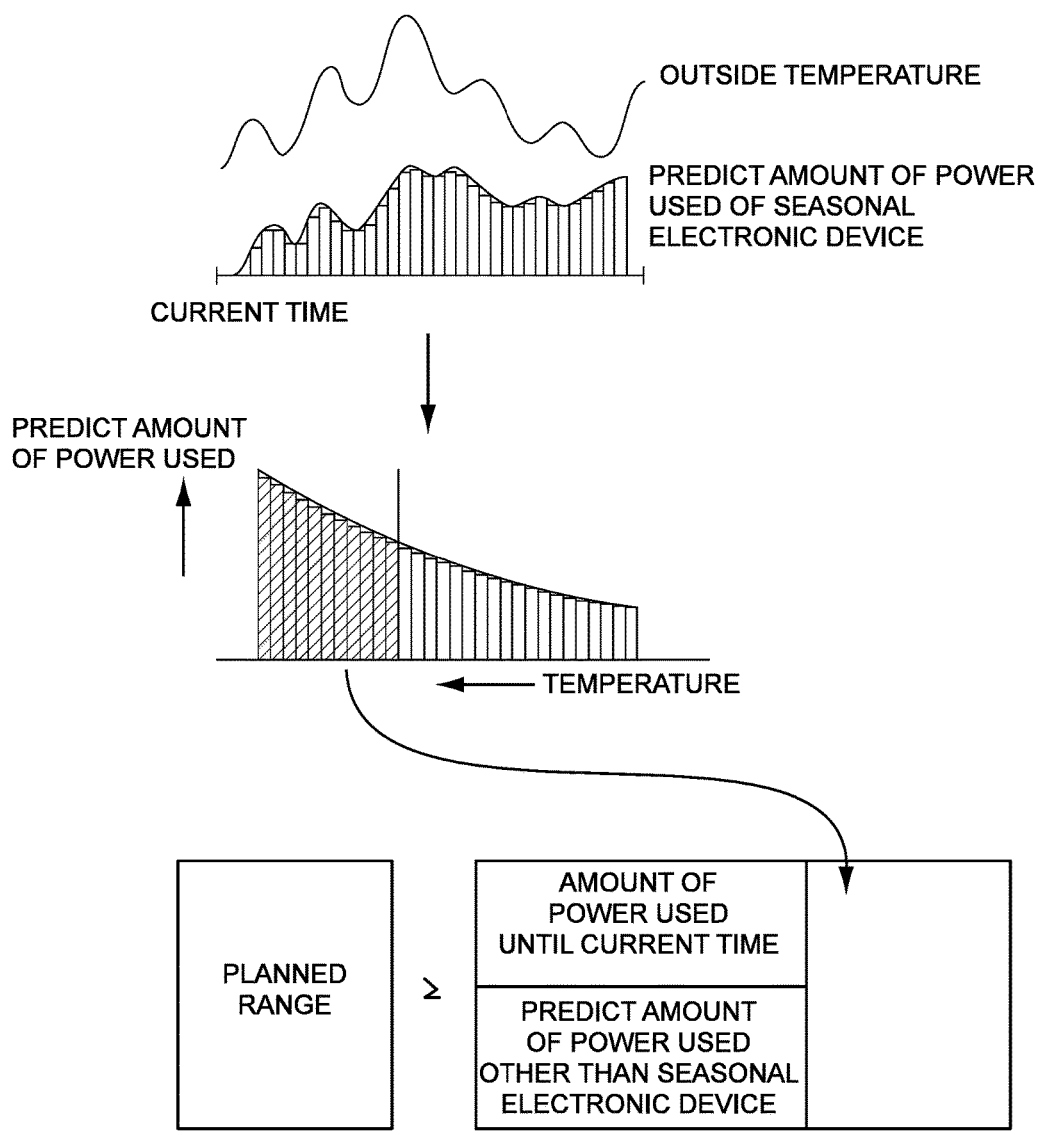

In a case where the seasonal electronic device should be limitedly used for a specific time, it is suggested to preferentially use the seasonal electronic device when a degree of satisfaction of the user according to the use of the electronic device is large. For example, since the use of an air conditioner at a time, at which an outside temperature is high, in summer gives larger satisfaction than the use of the air conditioner at a time, at which a temperature is low than the high temperature, it is suggested to preferentially use the air conditioner at a time zone, in which the outside temperature is predicted to be high. That is, as illustrated in FIG. 6, a value obtained by arranging the predicted power used amounts of the seasonal electronic device for the prediction periods Tc to Te in a descending order and sequentially adding the obtained values from a high section may be restricted so as not to exceed a value obtained by subtracting the amount P_current of power used by the current time and the amount sum P_habitual, j of power used by other electronic devices from the planned range B.

The exemplary embodiments of the present invention have been described with reference to the accompanying drawings, but the present invention is not limited to the exemplary embodiments and may be prepared in various forms, and it will be understood by a person with ordinary skill in the art, to which the present invention pertains, that the exemplary embodiments of the present invention may be implemented in other specific forms without modifying the technical spirit or essential feature of the present invention.

Thus, it is to be appreciated that the exemplary embodiments described above are intended to be illustrative in every sense, and not restrictive.

What is claimed is:

1. A method of guiding use of an electronic device, comprising:
   separating, using a processor, a first power used amount for a first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information;
   calculating, using a processor, a first predicted power used amount for the first electronic device from a first time point to a second time point by using a prediction value of the predetermined factor from the first time point to the second time point;
   calculating, using a processor, a second predicted power used amount for the second electronic device from the first time point to the second time point; and
   providing guide information, using an interface on a display, including a use time or an amount used for the first electronic device from the first time point to the second time point in consideration of a target amount of power used from the first time point to the second time point and the first and second predicted power used amounts.

2. The method of claim 1, wherein the calculating of the first predicted power used amount by using the prediction value of the predetermined factor from the first time point to the second time point includes:
   receiving a minimum value and a maximum value of the predetermined factor from the first time point to the second time point for each first section;
   generating a prediction value of the predetermined factor for each second section, which is smaller than the first section, by using interpolation; and
   calculating the first predicted power used amount by using the generated prediction values of the predetermined factor.

3. The method of claim 1, wherein the calculating of the first predicted power used amount by using the prediction value of the predetermined factor from the first time point to the second time point includes:
   receiving a prediction value of the predetermined factor from a third time point, which is later than the first time point, to the second time point, or receiving a prediction value of the predetermined factor from the first time point to a fourth time point, which is earlier than the second time point;
   generating a prediction value of the predetermined factor from the first time point to the second time point by using extrapolation; and
   calculating the first predicted power used amount by using the generated prediction values of the predetermined factor.

4. The method of claim 1, wherein the providing of the guide information includes:
   providing all of the first predicted power used amount as the guide information when a value obtained by subtracting the second predicted power used amount from the target amount of power used is larger than the first predicted power used amount, and providing a part of the first predicted power used amount as the guide information when the value obtained by subtracting the second predicted power used amount from the target amount of power used is smaller than the first predicted power used amount.

5. The method of claim 4, wherein the predicted power used amounts of the first electronic device from the first time point to the second time point are arranged in a descending order, the arranged values are sequentially added from a high section, and a partial section in an extracted predicted power used amount is provided as the guide information so that the obtained value does not exceed a value obtained by subtracting the power used amount to the first time point and the predicted power used amount of the second electronic device from the first time point to the second time point from the target amount of power used.

6. The method of claim 1, wherein the second predicted power used amount is calculated based on the second power used amount.

7. The method of claim 1, wherein the predetermined factor includes a temperature, and the first electronic device includes at least one of a cooling device and a heating device.

8. A system for guiding use of an electronic device, comprising:
a predicted power used amount calculating unit which separates a first power used amount for a first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information, calculate a first predicted power used amount for the first electronic device from a first time point to a second time point by using a prediction value of the predetermined factor from the first time point to the second time point, and calculate a second predicted power used amount for the second electronic device from the first time point to the second time point; and
a guide information providing unit which provides guide information including a use time or an amount used for the first electronic device from the first time point to the second time point in consideration of a target amount of power used from the first time point to the second time point and the first and second predicted power used amounts.

9. The system of claim 8, wherein the predicted power used amount calculating unit receives prediction information of the predetermined factor from the outside, and calculates a prediction value of the predetermined factor by using at least one of interpolation and extrapolation.

10. A system for guiding use of an electronic device, comprising:
an output unit which provides a user with an interface; and
a guide information providing unit which outputs guide information including a use time or an amount used for a first electronic device from a first time point to a second time point to the output unit,
wherein the guide information is provided by separating a first power used amount for the first electronic device having a first correlation coefficient between a predetermined factor and a power used amount thereof, and a second power used amount for a second electronic device having a second correlation coefficient between the predetermined factor and a power used amount thereof, the second correlation coefficient being smaller than the first correlation coefficient, from power used amount information, calculating a first predicted power used amount for the first electronic device from the first time point to the second time point by using a prediction value of the predetermined factor from the first time point to the second time point, calculating a second predicted power used amount for the second electronic device from the first time point to the second time point, and considering a target amount of power used from the first time point to the second time point and the first and second predicted power used amounts.

11. The system of claim 10, further comprising:
an input unit which receives target electric charges from the user in order to set the target amount of power used from the first time point to the second time point.

* * * * *